US006993337B2

(12) United States Patent
Rudrapatna et al.

(10) Patent No.: US 6,993,337 B2
(45) Date of Patent: Jan. 31, 2006

(54) VELOCITY BASED SCHEDULING IN CELLULAR SYSTEMS

(75) Inventors: Ashok N. Rudrapatna, Basking Ridge, NJ (US); Linda Marlene Zeger, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 598 days.

(21) Appl. No.: 09/821,790

(22) Filed: Mar. 30, 2001

(65) Prior Publication Data

US 2002/0142773 A1    Oct. 3, 2002

(51) Int. Cl.
    *H04Q 7/20*    (2006.01)
(52) U.S. Cl. .................. 455/440; 455/441; 455/404.2; 455/456.1; 375/225
(58) Field of Classification Search ........ 455/440–442, 455/445–446, 450, 452.1–2, 453, 436, 437–439, 455/454, 464, 456.2, 9, 238.1, 404.2, 414.1, 455/414.2, 456.1, 457; 375/225
See application file for complete search history.

(56) References Cited

U.S. PATENT DOCUMENTS

| | | | | |
|---|---|---|---|---|
| 5,535,425 A | * | 7/1996 | Watanabe | 455/436 |
| 5,822,318 A | * | 10/1998 | Tiedemann et al. | 455/403 |
| 5,884,187 A | * | 3/1999 | Ziv et al. | 455/522 |
| 5,963,870 A | * | 10/1999 | Chheda et al. | 455/522 |
| 6,052,598 A | * | 4/2000 | Rudrapatna et al. | 455/456.1 |
| 6,067,458 A | * | 5/2000 | Chen | 455/522 |
| 6,069,883 A | * | 5/2000 | Ejzak et al. | 455/450 |
| 6,073,025 A | * | 6/2000 | Chheda et al. | 455/522 |
| 6,088,335 A | * | 7/2000 | I et al. | 370/252 |
| 6,119,010 A | * | 9/2000 | Labedz | 455/446 |
| 6,137,840 A | * | 10/2000 | Tiedemann et al. | 375/297 |
| 6,154,659 A | * | 11/2000 | Jalali et al. | 455/522 |
| 6,188,678 B1 | * | 2/2001 | Prescott | 370/318 |
| 6,208,858 B1 | * | 3/2001 | Antonio et al. | 455/429 |
| 6,249,539 B1 | * | 6/2001 | Harms et al. | 375/130 |
| 6,271,757 B1 | * | 8/2001 | Touchton et al. | 340/573.1 |
| 6,278,883 B1 | * | 8/2001 | Choi | 455/552.1 |
| 6,324,207 B1 | * | 11/2001 | Kanterakis et al. | 375/141 |
| 6,347,080 B2 | * | 2/2002 | Jou et al. | 370/310 |
| 6,418,148 B1 | * | 7/2002 | Kumar et al. | 455/452.2 |
| 6,427,077 B1 | * | 7/2002 | Alberth et al. | 455/456.1 |
| 6,449,485 B1 | * | 9/2002 | Anzil | 455/456.1 |
| 6,473,411 B1 | * | 10/2002 | Kumaki et al. | 370/331 |
| 6,473,619 B1 | * | 10/2002 | Kong et al. | 455/456.1 |
| 6,493,328 B2 | * | 12/2002 | Fong et al. | 455/561 |
| 6,590,874 B1 | * | 7/2003 | Wang et al. | 370/318 |
| 6,611,507 B1 | * | 8/2003 | Hottinen et al. | 370/331 |
| 6,618,596 B1 | * | 9/2003 | Uchida | 455/522 |
| 6,678,257 B1 | * | 1/2004 | Vijayan et al. | 455/437 |

* cited by examiner

FOREIGN PATENT DOCUMENTS

JP          09163458 A   *  6/1997

*Primary Examiner*—Cong Van Tran (57) ABSTRACT

The method for maximizing data throughput for cellular communications is disclosed. The invention is based upon the fact that each base station of a cell has a finite amount of transmit power and that mobile devices in different locations require transmission from the base station having varying amounts of RF signal power. The method efficiently distributes the signal power of the base station using the speed, location, and direction of the mobile device as control parameters, so more mobile devices can be serviced with increased overall system throughput. Moreover, a particular mobile device can receive signals transmitted with more than the required RF signal power, with respect to the mobile device's signal to interference ratio, to increase the data throughput of that mobile device.

46 Claims, 13 Drawing Sheets

VELOCITY BASED SCHEDULING IN CELLULAR SYSTEMS

BACKGROUND OF THE INVENTION

I. Field of the Invention

The present invention relates generally to a method for cellular communication. In particular, the invention relates to maximizing data rates in cellular communication systems.

II. Description of the Related Art

Cellular communication systems have experienced tremendous growth in the past few years as the number of wireless end users have increased. Coupled with increased end users, cellular communication use has expanded to a wide array of applications. These applications include the popular wireless telephone use, global position satellite systems and wireless data transfer, e.g. wireless internet or electronic mail access. As the number of end users and types of applications increase, the need to maximize data throughput also increases.

Figure 1:
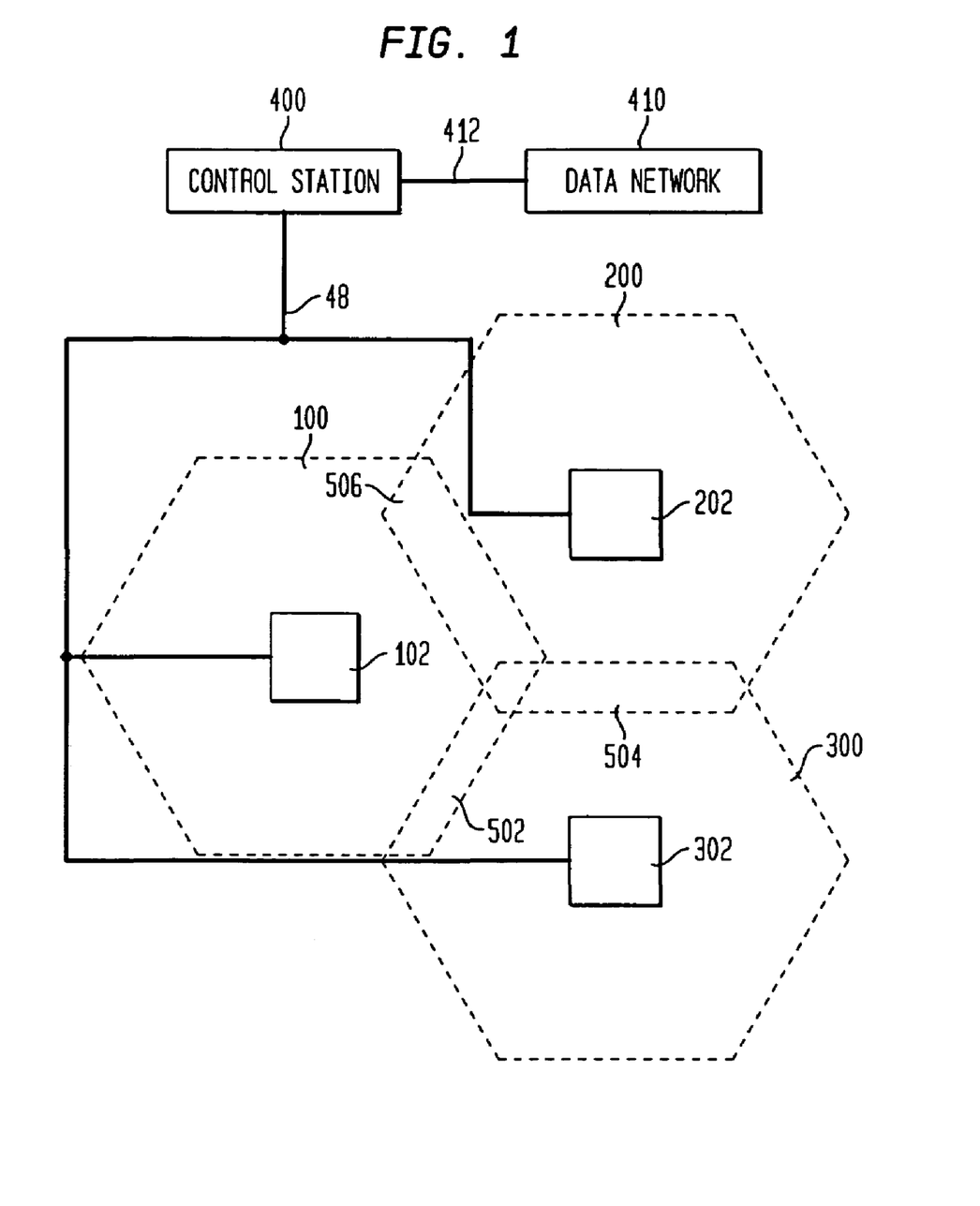
FIG. 1 is an illustration of a cellular system which employs the present invention.

As FIG. 1 shows, in order to serve large geographic areas, cellular communication systems are divided into cells 100, 200, 300 that each encompass particular geographical sections of the service area. A base station 102, 202, 302 is deployed in and is associated with each cell 100, 200, 300. The base stations 102, 202, 302 of various cells 100, 200, 300 are connected by a wireline network 48 and are controlled by a control station 400 using the wireline network 48. The control station 400 provides the necessary computing and communication processing required to manage the network of base stations 102, 202, 302 throughout the service area.

Each base station 102, 202, 302 services all the mobile devices within the cell 100, 200, 300 surrounding the base station 102, 202, 302 with a required radio frequency (RF) signal. RF signal strength for a signal received by a mobile device varies based upon the mobile device's location in the cell and velocity. However, generally, a required RF signal strength (power) is one where the signal to interference ratio (SIR) is within a satisfactory range at the mobile device receiving a downlink signal. (This is also true for a base station 102, 202, 302 receiving an uplink signal.) Such an acceptable range is known to those skilled in the art. An acceptable SIR is one whereby a signal can be received by a mobile device (or by a base station receiving an up link signal) without excessive interference which would require re-transmission or loss of data. We consider here systems, such as CDMA as well as third and later generation systems using other multiple access techniques, in which each mobile device can be allocated a different signal strength, depending upon need. As used herein, "mobile device" is defined as any type of mobile wireless communications device including but not limited to portable cellular telephones; automobile telephones; laptop and palmtop computers and personal digital assistant (PDA) equipment with wireless modems; time division multiple access (TDMA), code division multiple access (CDMA) and general packet radio services (GPRS) transceivers; pagers; and other wireless voice and data communication devices.

The base station 102, 202, 302 in each cell 100, 200, 300 has a number of radio communication channels which it can assign for transmissions within that cell 100, 200, 300 and a finite total available RF signal power the base station 102, 202, 302 can use. The required RF signal power needed for a transmission is an increasing function of the distance a mobile device is from the base station 102, 202, 302. Therefore, for the same data transfer rate, a mobile device closer to a base station 102, 202, 302 will require less power in terms of RF signal power than a mobile device more distant from a base station 102, 202, 302. When mobile devices are closer to their respective base station 102, 202, 302 of the cell 100, 200, 300, base station power is conserved. With this conserved power each base station can: (a) service more mobile devices within a cell 100, 200, 300, assuming the respective base station 102, 202, 302 has additional communication channels available, thereby increasing overall system throughput or (b) increase the data rate for a particular mobile device which includes increasing the signal power allocated for that mobile device, assuming the base station 102, 202, 302 and the mobile device can switch to a common protocol which allows for faster data transmission.

The individual cells 100, 200, 300 tile the entire geographical service area. However, the tiling is not exact and neighboring cells 100, 200, 300 normally overlap at handoff regions. (A handoff region is not always a static region and can be variable. Further, a handoff region does not usually occur exactly at a geometric cell border, but rather is based upon RF signal conditions and is affected by factors such as log-normal shadowing and terrain.)

According to conventional practice, when a mobile device crosses the boundary of the current cell, i.e. 100, and moves into another cell, i.e. 200, while transmitting information, a communication path must be established with a new base station 202 located in the new cell 200. If a radio communication channel is not available in the new cell 200 and the mobile device is not able to acquire a new channel in the new cell 200 before it crosses over the boundary and moves completely into the new cell 200, a handoff failure will occur and a transmission in progress will be aborted and, in the case of a pure data transmission, the data must be re-sent once connectivity to the new cell 200 is established. A transmission failure can also occur even if a communication channel is available but the new cell 200 does not have enough remaining RF signal power to support the mobile device in question. The probability of handoff failure, that is, the probability that a transmission in progress will be forcibly aborted during a handoff is a major concern in cellular systems. Handoff failure equates to decreased throughput in mobile devices particularly for data transmission, as the data must be re-sent. Thus, there is a need for a cellular system, which efficiently allocates base station RF signal power, in order to increase individual mobile device data throughput and increase overall network throughput by decreasing data transmission errors and handoff failures, by transmitting to the individual mobile devices when the possibility of transmission and/or handoff failures for each mobile device is minimal.

SUMMARY OF THE INVENTION

The present invention provides a method for maximizing data throughput for cellular communications. The invention is based upon the fact that each base station of a cell has a finite amount of transmit power and that mobile devices in some locations, often those closer to the base station, require less power than those in other locations. (Factors other than location, such as terrain, log-normal shadowing, interference received from other base stations, affect the signal power required.) The present invention efficiently distributes the signal power of the base station using the speed, location, and direction of the mobile device as control parameters by choosing optimal times, places, and signal strengths at which to serve the various mobile devices, so more mobile devices can be serviced with increased overall system throughput and increase overall network throughput by decreasing data transmission errors and handoff failures by transmitting to the individual mobile devices when the possibility of transmission and/or handoff failures for each mobile device are minimal. Moreover, a particular mobile device can use more than the required signal power to increase the data throughput of that mobile device.

The principles of this invention are applicable to data transmission in PCS and cellular networks for third and subsequent generation systems using CDMA, GPRS, and other multiple access techniques.

BRIEF DESCRIPTION OF DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

Referring now to the drawings, where like reference numerals designate like elements, FIG. 1 illustrates cells 100, 200, 300 each containing a base station 102, 202, 302. Each base station 102, 202, 302 communicates with mobile devices in its respective cell. The base stations 102, 202, 302 monitor data transmissions in the network of cells 100, 200, 300, determine and predict traffic patterns and the probability of cell 100, 200, 300 boundary crossings, and issues warnings and commands with respect to anticipated resource demand. Alternatively, a control station 400 may perform all or a portion of the above described functions performed by the base stations 102, 202, 302. The control station 400 is in communication with the base stations 102, 202, 302, through wire line 48. The control station 400 is also in communication with a data network 410 through network line 412. The invention relies on the acquisition of speed, location, and direction information of a mobile device relative to a base station 102, 202, 302 as a control parameter for assigning a signal power for the base station to use in communicating with mobile device(s) it is servicing.

Figure 6:
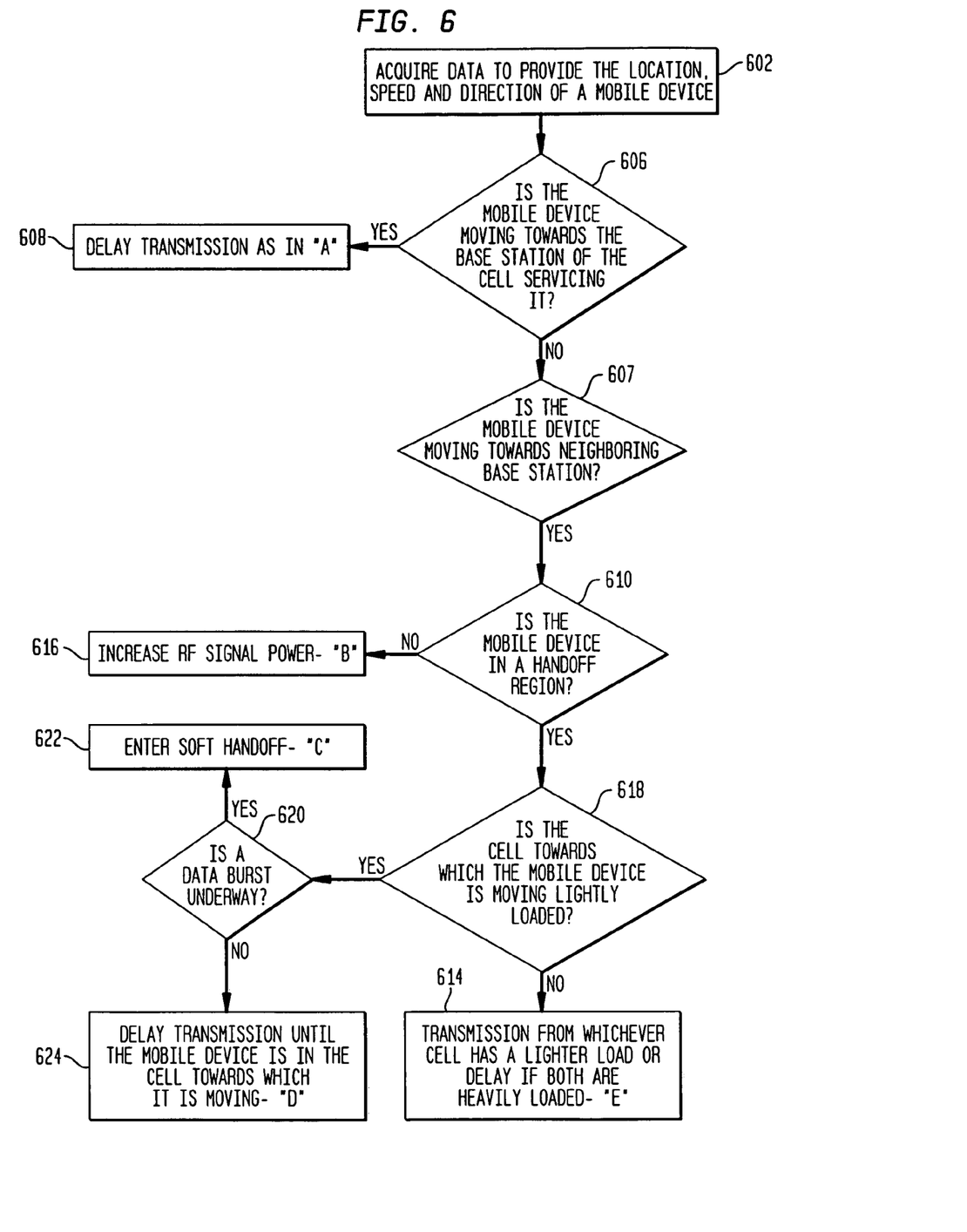
FIG. 6 is a flow chart illustrating the process flow of a network control program incorporating several operation conditions in an exemplary embodiment of the present invention.

Using the above system of FIG. 1, many operating conditions can be used to efficiently conserve RF signal power. FIG. 6, discussed in detail below, illustrates a plurality of operating conditions of an exemplary embodiment of this invention in one integrated network system. However, for simplicity of explanation, each operation condition is described individually with accompanying figures before FIG. 6 is discussed.

Figure 2A:
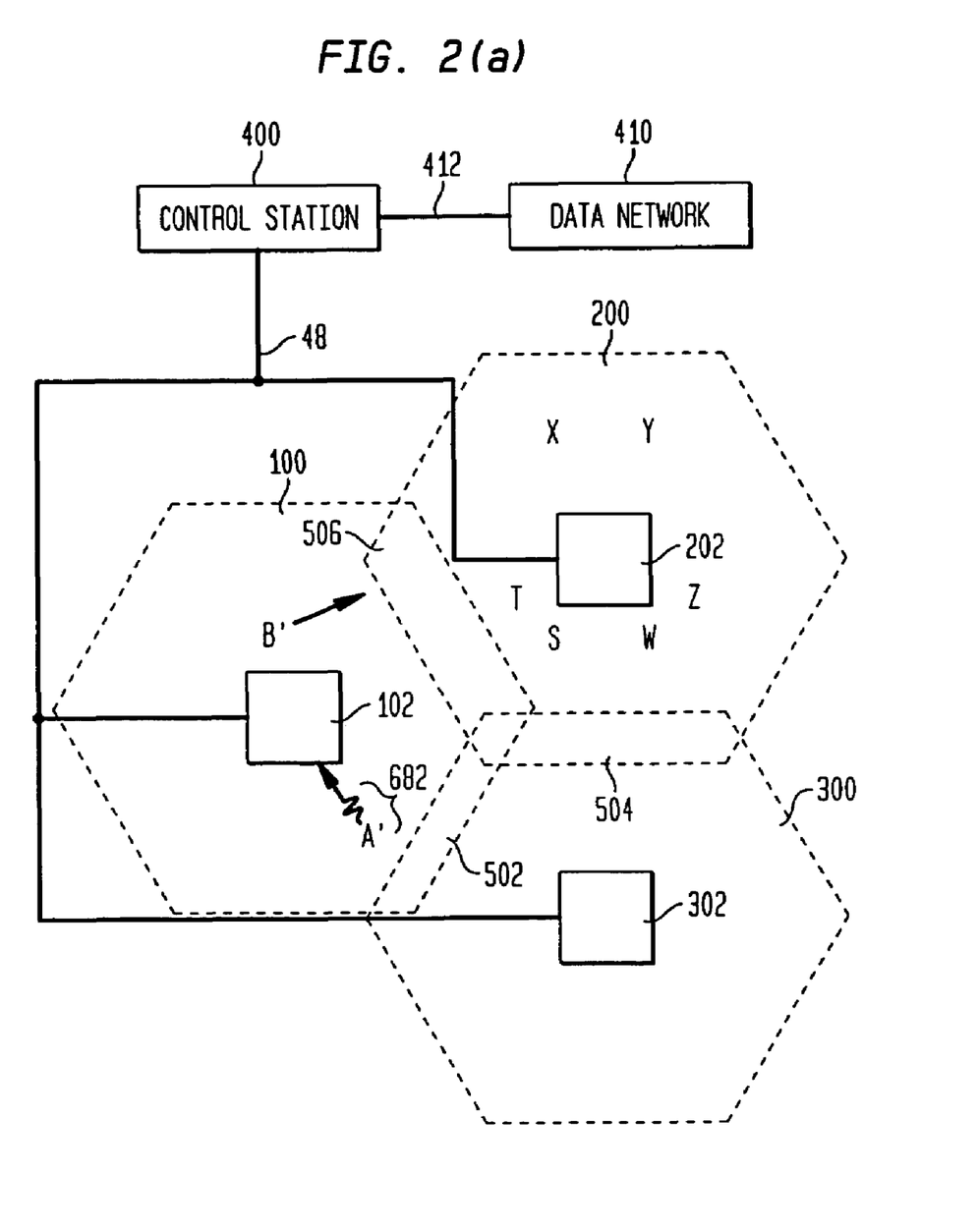
FIG. 2(a) is an illustration of the system of FIG. 1 depicting operating conditions "A" and "B" which are managed in accordance with an exemplary embodiment of the present invention.

Referring to FIG. 2(a), under operating condition "A," as well as operating conditions to follow, speed, location and direction information are used to determine which base station 102, 202, 302 will service a mobile device, the signal power level which the servicing base station 102, 202, 302 will use to service the mobile device, and the time at which the servicing base station 102, 202, 302 will service the mobile device. As stated above, the RF signal power required at the base station 102, 202, 303 is one where the signal to interference ratio (SIR) is acceptable at the mobile device receiving a downlink signal. (This is also true for a base station 102, 202, 302 receiving a uplink signal.) Such an acceptable SIR is known to those skilled in the art. The SIR represents the signal level where a signal can be received by a mobile device (or by a base station receiving an up link signal) without excessive interference which would require re-transmission or loss of data. Methods for determining speed, location and direction of a mobile device are commonly known by those skilled in the art. Exemplary methods are disclosed, for example, in U.S. Pat. Nos. 6,052,598 and 5,777,580 which are incorporated herein by reference.

Figure 2B:
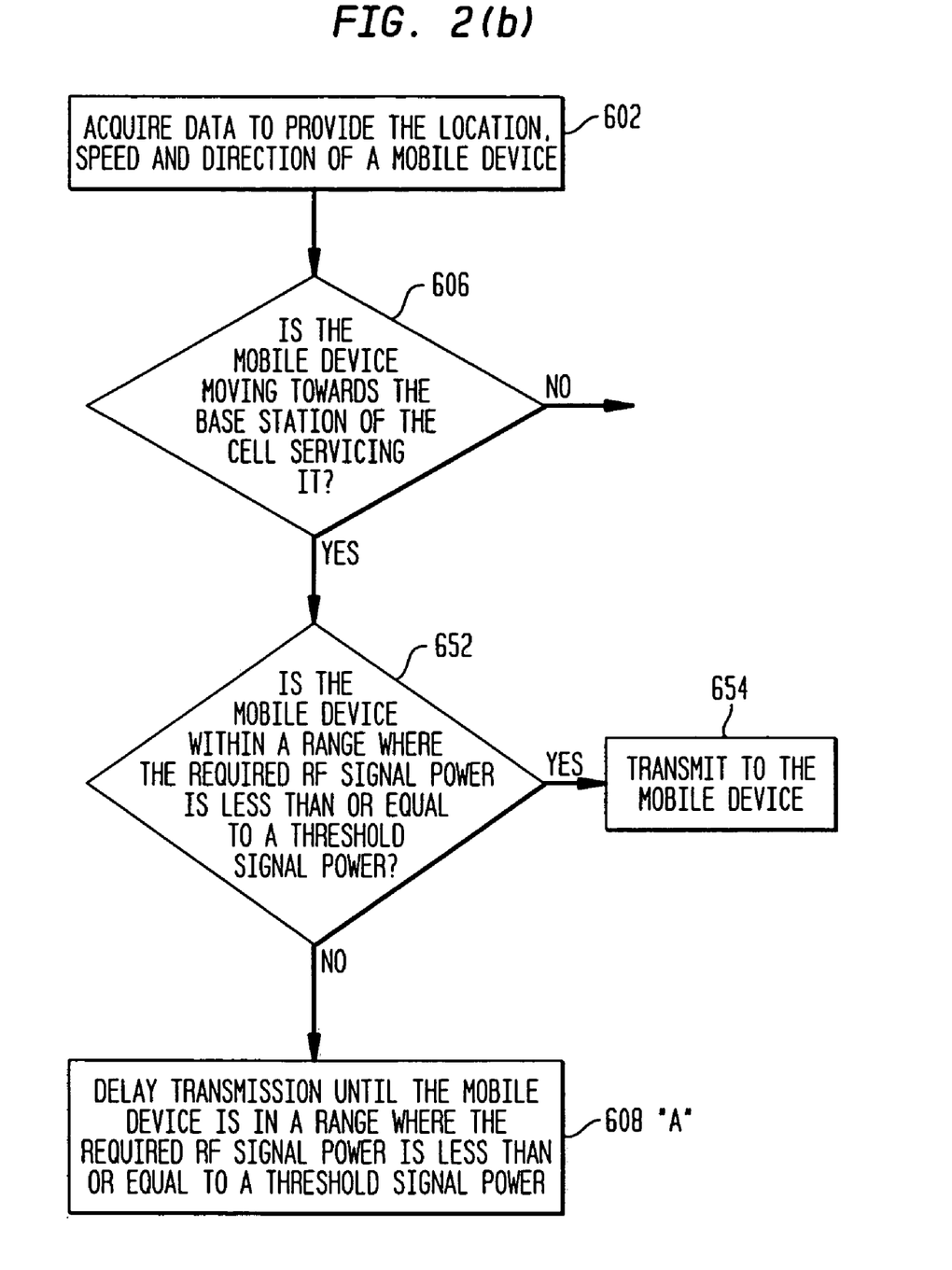
FIG. 2(b) is a flow chart illustrating the process flow of a network control program for operating condition "A" in an exemplary embodiment of the present invention.

The invention implements the following control rules for distributing and assigning RF signal power for a base station to transmit to a mobile device. Referring to FIGS. 2(a) and 2(b), under operating condition "A," location, speed and direction information is acquired for a mobile device A' (step 602). If mobile device A' is moving towards a base station 102 within a cell 100 (step 606), transmission to that mobile device A' is delayed (as represented by curved line 682; step 608) until the mobile device A' is within a range where the required RF signal power is less than or equal to a threshold signal power (step 652). The threshold signal power simply represents a predetermined signal power where transmission to the mobile device A' is determined to be most efficient within a cell 100, 200, 300. A threshold signal power, as defined above, can be easily determined by one skilled in the art but is unique for each cellular system. The threshold signal power, for example, could be chosen to be ⅙ of the required signal power from the furthest edge of the cell in which the mobile device is currently traveling. Further, the threshold RF signal power can vary amongst operating conditions. When the mobile device A' is within a range where the required RF signal power is less than or equal to a threshold signal power, the mobile device A' will require less power than that needed in other locations of the cell 100, 200, 300 for the same data rate (step 654). (X, Y, T, S, W, Z denote other mobile devices which base station 102 is servicing.)

Figure 2C:
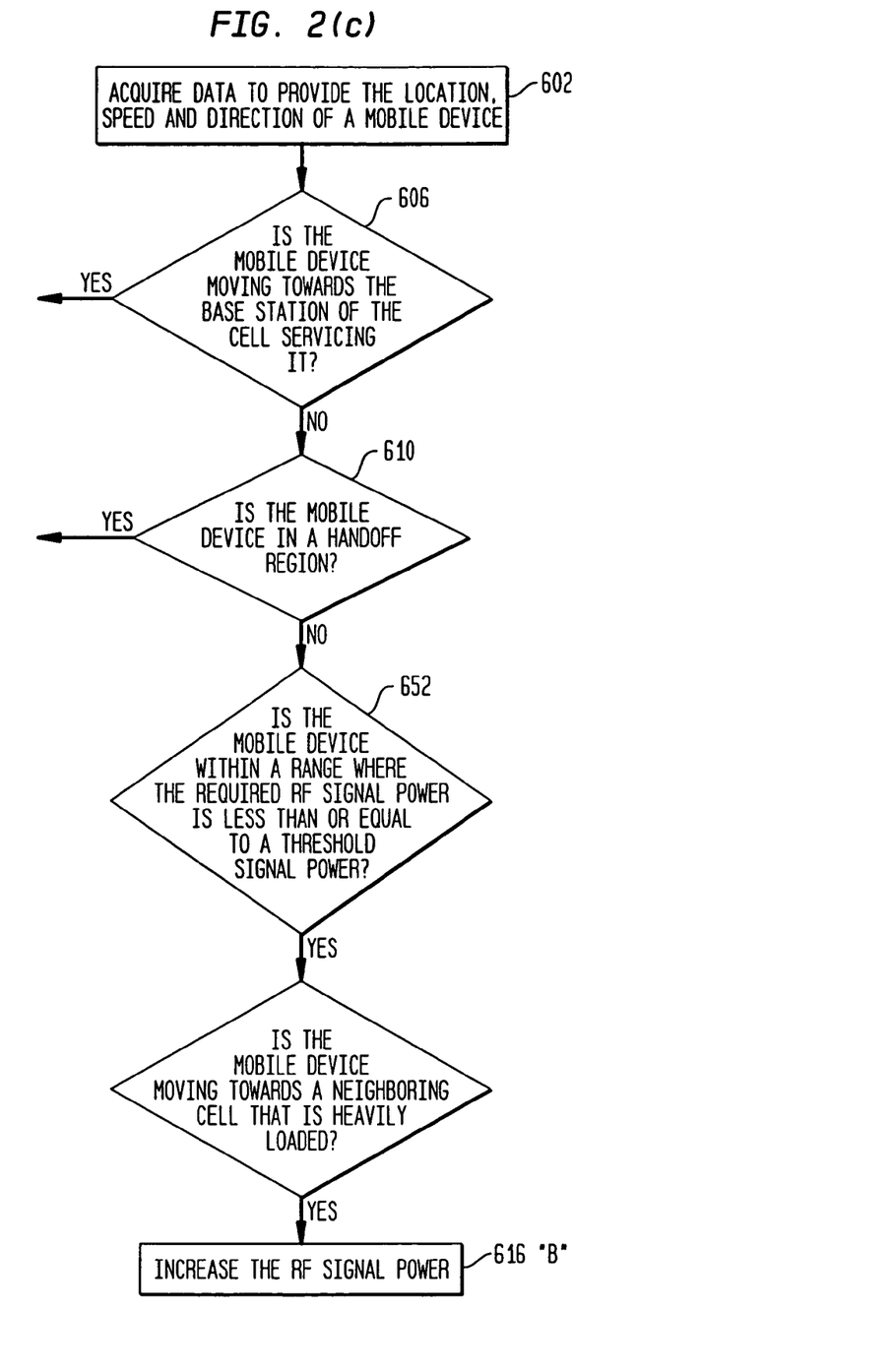
FIG. 2(c) is a flow chart illustrating the process flow of a network control program for operating condition "B" in an exemplary embodiment of the present invention.
Figure 3A:
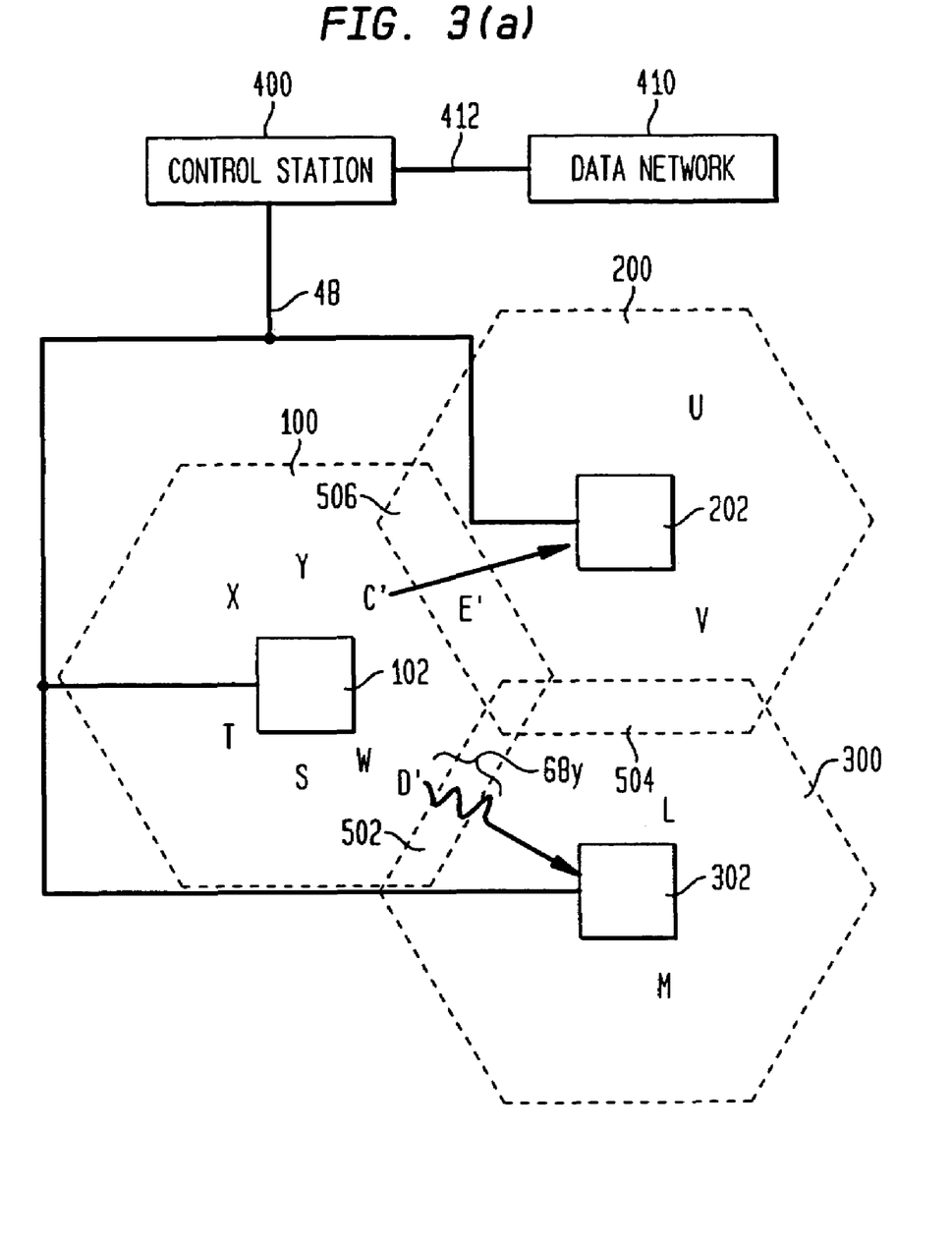
FIG. 3(a) is an illustration of the system of FIG. 1 depicting operating conditions "C" through "E" which are managed in accordance with an exemplary embodiment of the present invention.
Figure 3B:
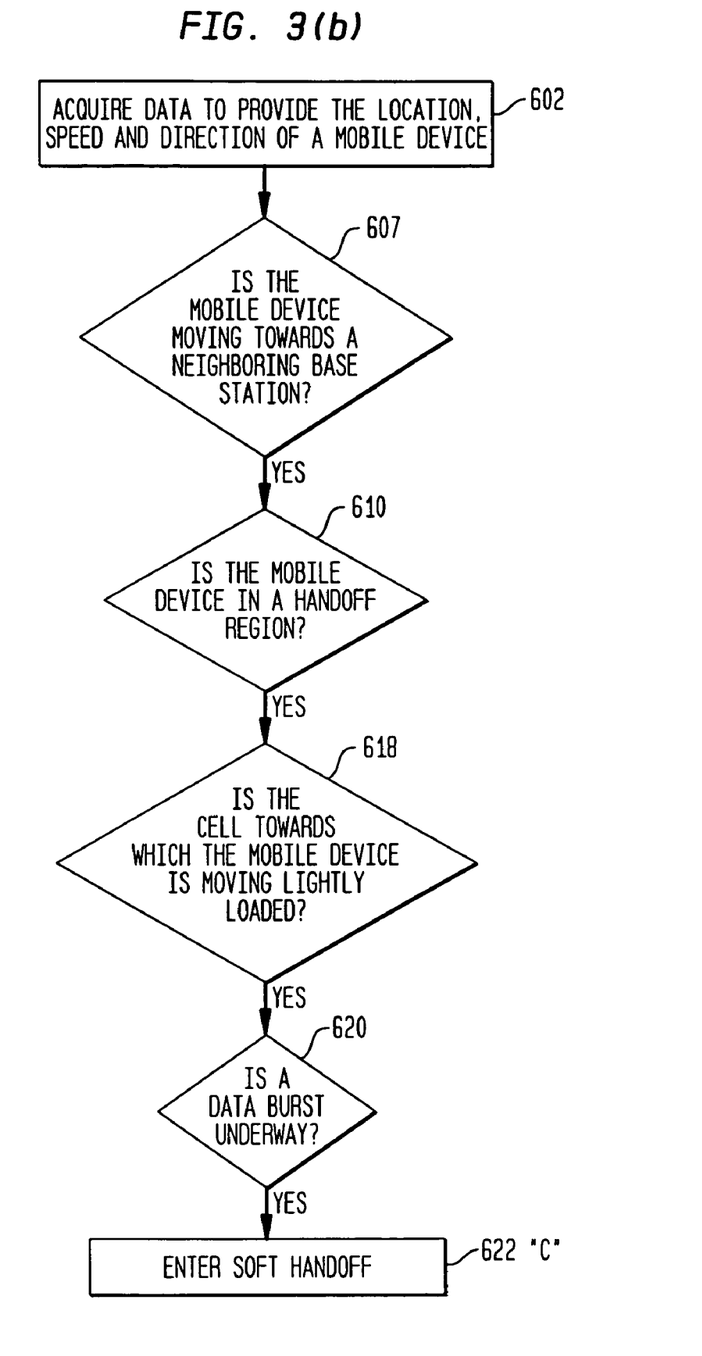
FIG. 3(b) is a flow chart illustrating the process flow of a network control program for operating condition "C" in an exemplary embodiment of the present invention.
Figure 3C:
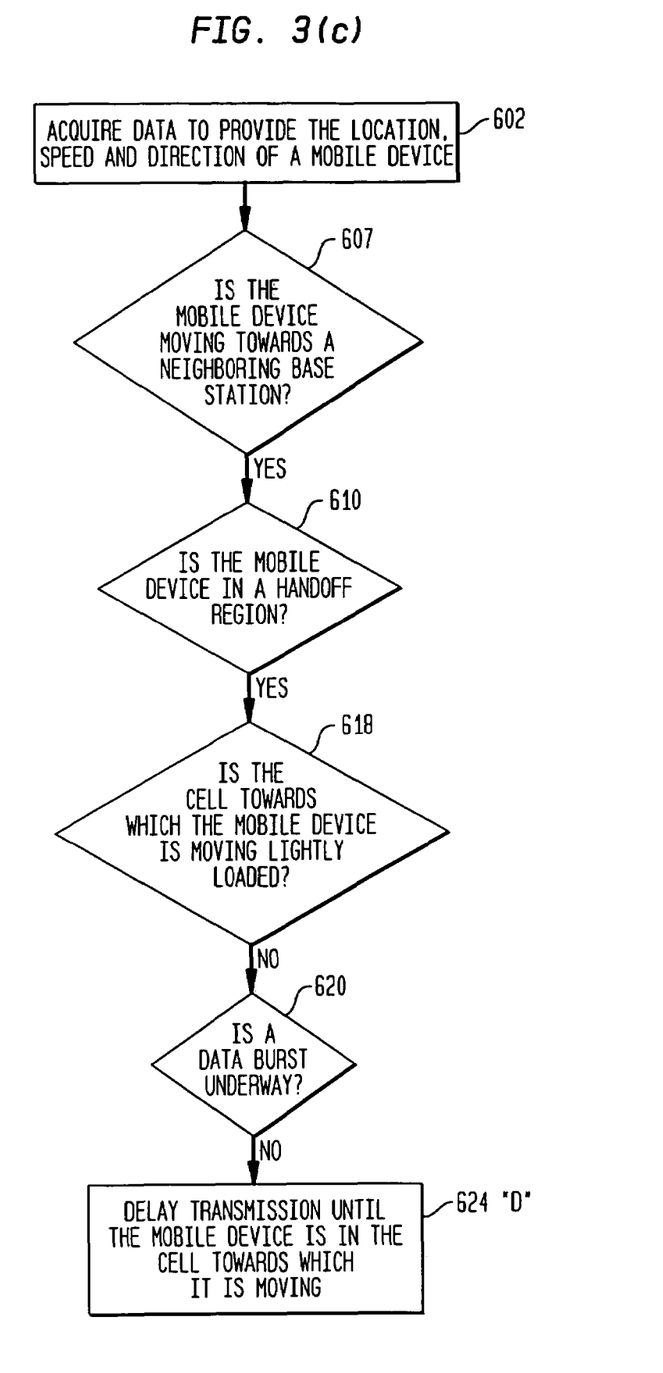
FIG. 3(c) is a flow chart illustrating the process flow of a network control program for operating condition "D" in an exemplary embodiment of the present invention.
Figure 3D:
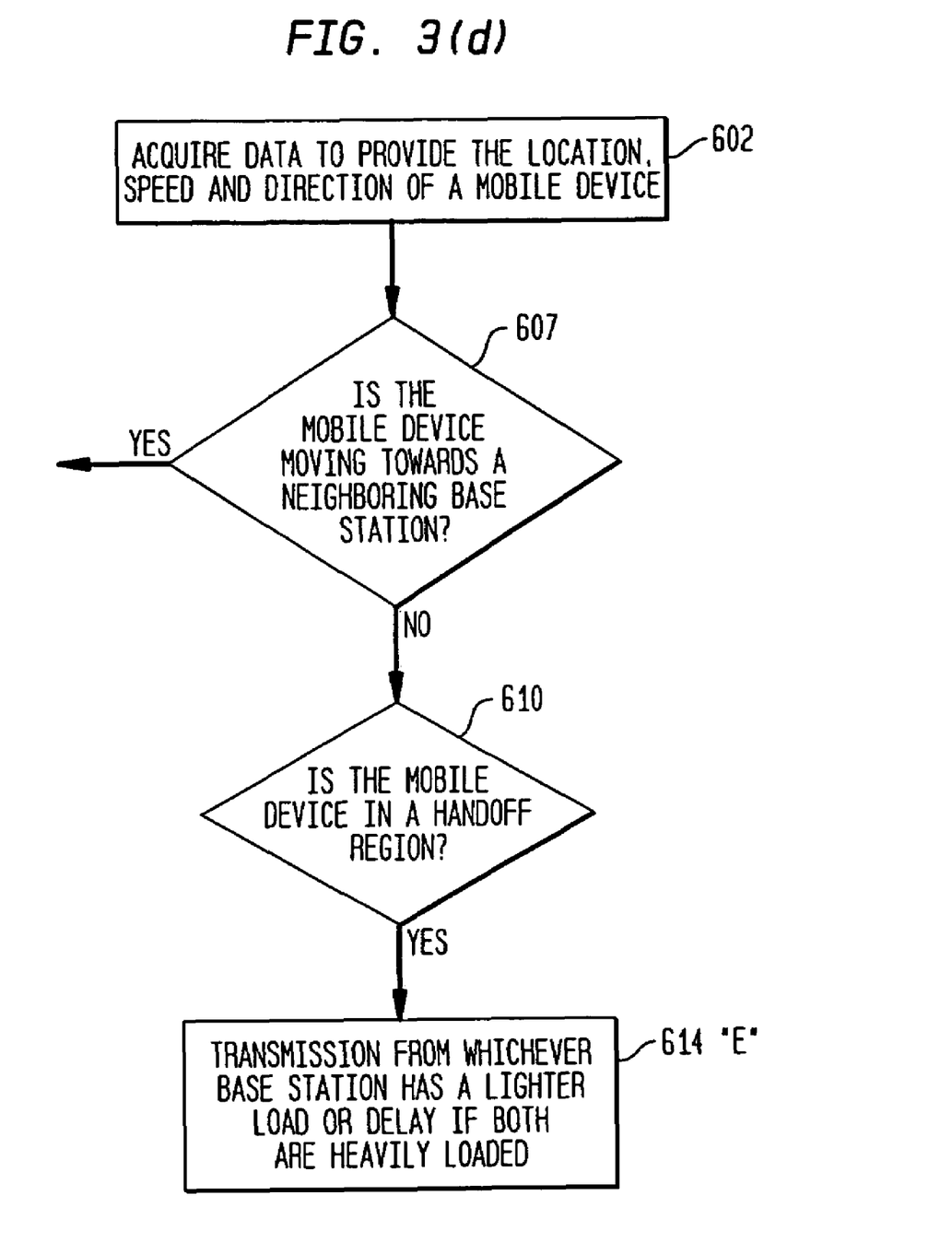
FIG. 3(d) is a flow chart illustrating the process flow of a network control program for operating condition "E" in an exemplary embodiment of the present invention.

Referring to FIGS. 2(*a*) and 2(*c*), under operating condition "B," location, speed and direction information is acquired for a mobile device B' (step 602). If a mobile device B' is (a) moving away from base station 102 (step 606), (b) not in a handoff region (step 610), (c) within a range where the required RF signal power is less than or equal to the threshold RF signal power (step 652) and (d) the neighboring cell 200 is heavily loaded (step 670), then the RF signal power to mobile device B' is increased thereby enabling data to be sent at an increased data transmission rate (step 616). A base station is heavily loaded when the base station meets a predefined heavy load amount, for example, when the base station has allocated eighty-five percent or more of its total RF signal power. A heavy loaded amount can be easily determined by one skilled in the art but is unique for each cellular system and may vary per base station 102, 202, 302.

Referring to FIGS. 3(*a*) and 3(*b*), under operating condition "C," location, speed and direction information is acquired for a mobile device C' (step 602). If a mobile device C' is (a) moving towards a neighboring base station 202 (step 607) and is in a handoff region (between two cells, e.g. 100, 200—step 610), (b) the neighboring cell, e.g. 200, toward which it is moving, is lightly loaded (step 618), and (c) if a data burst is already underway (step 620), a soft handoff with the neighboring base station, e.g. 202, is performed (step 622). A base station is lightly loaded when the base station meets a predefined light load amount, for example, when the base station's total power transmission consists of overhead channel power (normally 20–25% of the total RF maximum signal power) and traffic channel power (used to transmit the end user data) does not exceed as an example five percent of the total RF signal power. A lightly loaded amount can be easily determined by one skilled in the art but is unique for each cellular system and may vary per base station. A soft handoff is defined as a transfer of base station coverage during a transmission without aborting the transmission, where at one point in time both base stations of a handoff region transmit identical data to the mobile device as to avoid a loss of continuity during transition. In a soft handoff the mobile device approaches a new cell while still receiving reasonable signal power from the old cell. The mobile device then receives transmission from the new cell long before the mobile device closes connection with the old cell. A hard handoff is defined as a transfer of base station coverage also during a transmission, where the one base station drops coverage and another base station acquires the mobile device without an overlap in signal transmission. A hard handoff is sharp and more likely to result in a handoff failure. A handoff failure is defined as an abortion of transmission when transferring a mobile device between base stations while a transmission is in progress. Entering soft handoff can be advantageous, particularly if base station 102 is heavily loaded, as it will decrease the power which base station 102 must allocate to mobile device' while mobile device C' is in the handoff region. In addition, the lightly loaded base station 202 has excess power available which it can allocate to the mobile device "C."

Referring to FIGS. 3(*a*) and 3(*c*), under operating condition "D," location, speed and direction information is acquired for a mobile device D' (step 602). If the mobile device D' is (a) moving towards a neighboring base station 302, (b) located in a handoff region (steps 607, 610), when neighboring base station 302 is lightly loaded (step 618) and (c) not in the middle of receiving a data burst from a heavily loaded base station 102 (steps 607, 610), then transmission is delayed (as represented by curved line 684) until the mobile device D' arrives in the lightly load neighboring cell 300 where it can then be serviced by base station 302 (step 624).

Referring to FIGS. 3(*a*) and 3(*d*), under operating condition "E," location, speed and direction information is acquired for a mobile device D' (step 602). If a mobile device E' (a) has not been moving towards either cell 100, 200 and (b) is in a handoff region (steps 607, 610), then transmission to that mobile device E' is provided by whichever base station 100, 200 has less of a load in terms of available RF signal power (step 614). If both base stations 100, 200 are heavily loaded then transmission is delayed until one base station 100, 200 becomes lightly loaded (step 614).

Figure 4A:
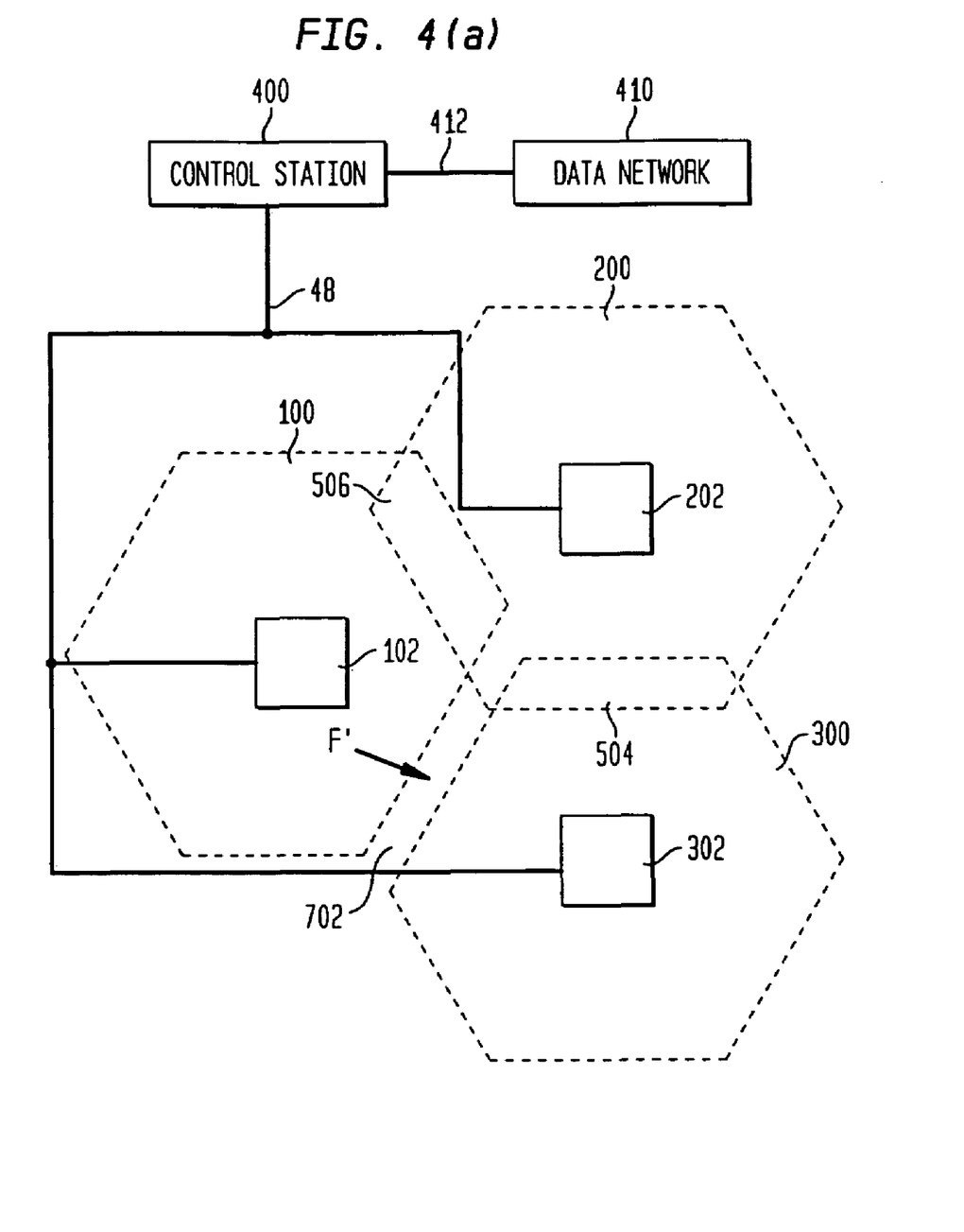
FIG. 4(a) is an illustration of the system of FIG. 1 depicting operating condition "F" which is managed in accordance with an exemplary embodiment of the present invention.
Figure 4B:
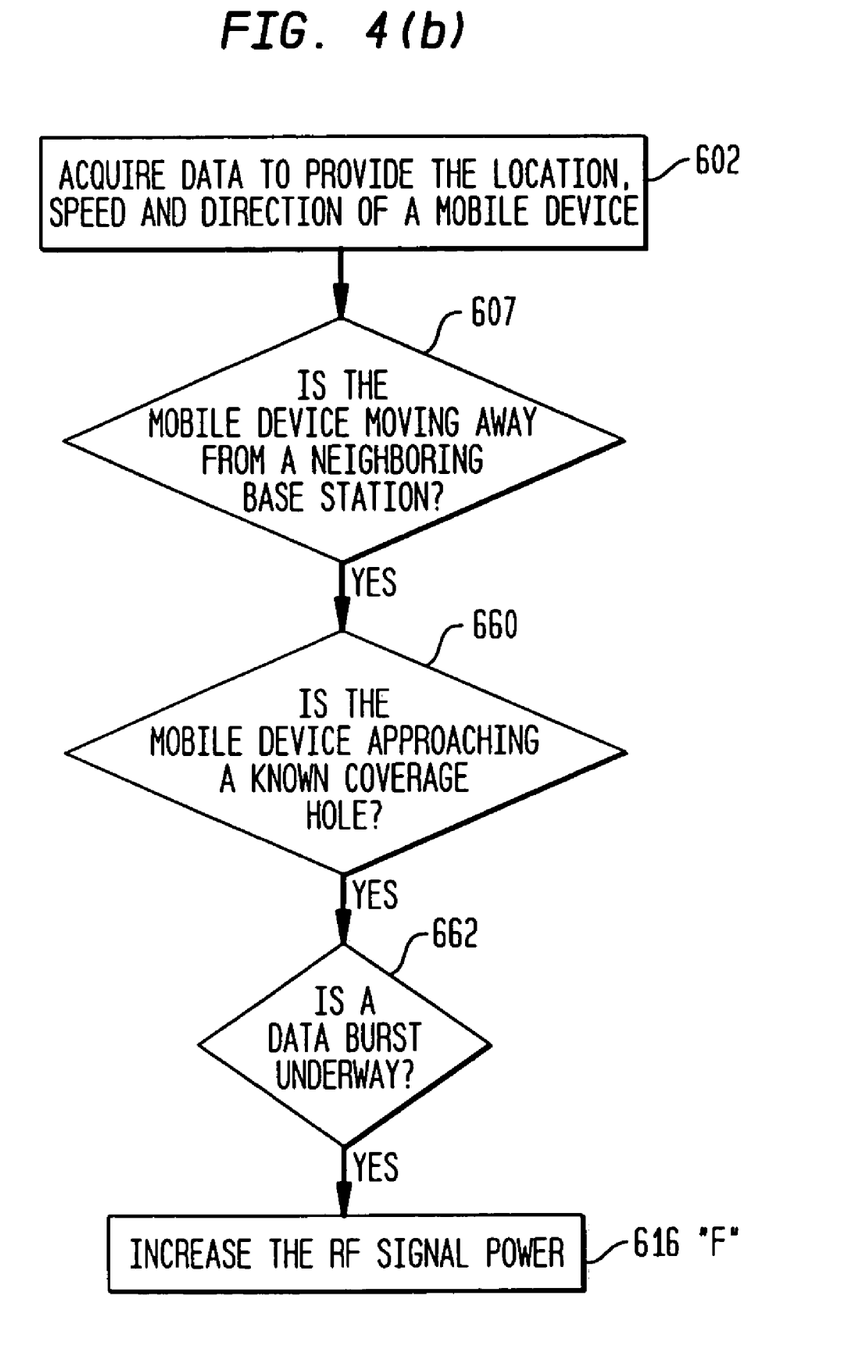
FIG. 4(b) is a flow chart illustrating the process flow of a network control program for operating condition "F" in an exemplary embodiment of the present invention.

In determining how to operate a cellular system, information on the amount of data to be transmitted can also be used as a control parameter in conjunction with the mobile device's speed and direction. For example, as depicted in FIGS. 4(*a*) and 4(*b*), if soft handoff is not possible, e.g. because of a known coverage hole 702 (step 660), the system should attempt to complete data bursts before the mobile device leaves the current cell 100 by increasing the RF signal power and thus increasing the data rate to the mobile device F' (steps 662, 616). It may be desirable to delay transmission to mobile device F' if the burst cannot be completed before mobile device F' leaves cell 100. The above can also be applied to mobile devices moving between sectors of the same cell.

An exemplary embodiment of a control program implementing all of the above described operating conditions for base stations 102, 202, 302, all of which may contain a processor and memory, is illustrated in FIG. 6. First, location, speed and direction information is acquired for a mobile device in step 602. As mentioned above, such methods are known by those skilled in the art. Next, in step 606, a determination is made as to whether the mobile device is moving towards the base station of the cell which is servicing it. If the mobile device is moving towards such a base station, transmission is delayed per operating condition "A," if the conditions for operation condition "A" are satisfied (see above) in step 608. If the mobile device is not moving towards such a base station, a determination is made in step 607 as to whether the mobile device is moving towards a neighboring base station. If the mobile device is moving towards a neighboring base station, in step 610, a determination is made as to whether the mobile device is in a handoff region. If the mobile device is not in a handoff region, RF signal power is increased per operating condition "B" (or "F") if the conditions for operation condition "B" (or "F") are satisfied (see above) in step 616. If the mobile device is in a handoff region, a determination is made as to whether the neighboring base station towards which the mobile device is moving is lightly loaded in step 618. If it is not lightly loaded the base station with a lighter load provides transmission or if both base stations are heavily loaded transmission is delayed in step 614, operating condition "E." If the base station towards which the mobile device is moving is lightly loaded, a soft handoff is entered if the mobile device is receiving a data burst in steps 620, 622 or transmission is delayed if the mobile device is not receiving a data burst in steps 620, 624. The above illustration is one exemplary embodiment, many other possible combinations of individual operating conditions "A" through "F" discussed above will be readily apparent to those skilled in the art.

Figure 5A:
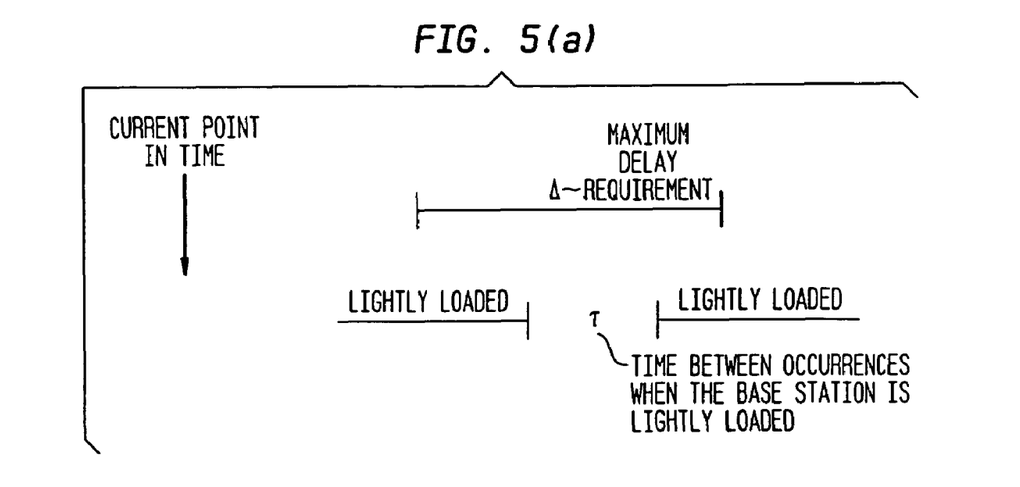
FIGS. 5(a)–5(b) show timing diagrams illustrating maximum transmission delay timing for a mobile device verses light load times for a base station.
Figure 5B:
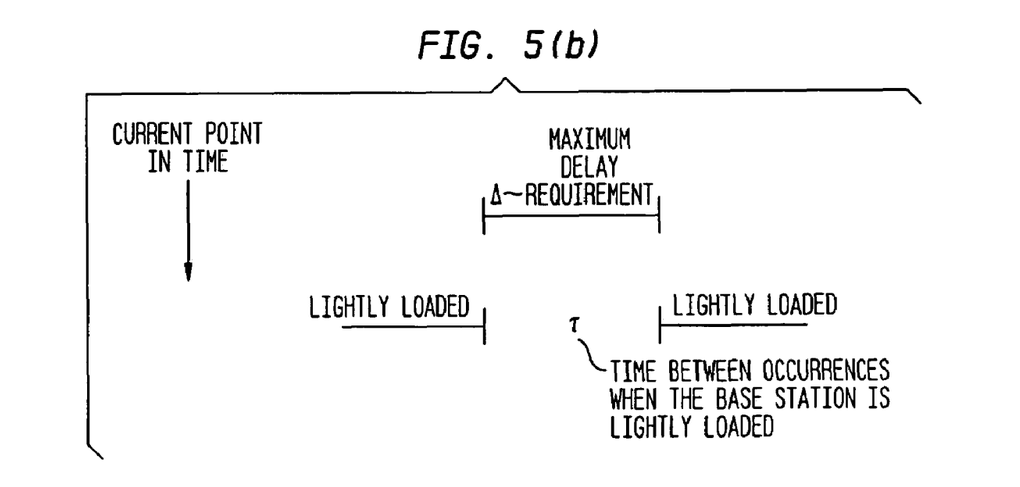
Figure 5C:
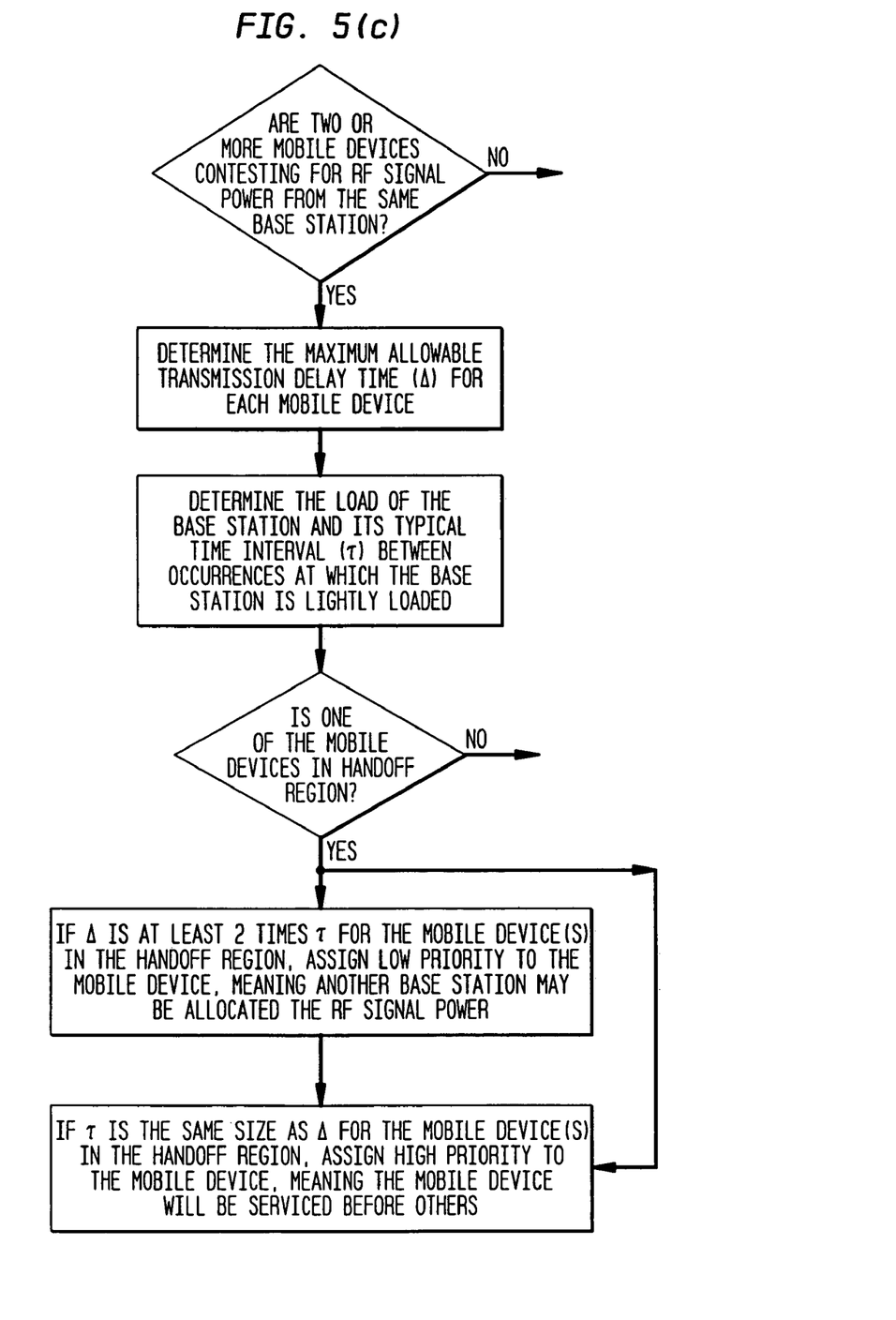
FIG. 5(c) is a flow chart illustrating the process flow of a network control program determining scheduling in an exemplary embodiment of the present invention.

We note that in order to determine the exact priority order for the operating conditions described above, as well as the associated performance gains, the probability density of neighboring base station loads, needs to be considered. Each base station 102, 202, 302 can keep a record of the probability density of neighboring base station loads based upon recent history. Methods for predicting and determining probable density based upon probable location of mobile devices are disclosed in U.S. Pat. No. 6,052,598, the contents of which are incorporated herein by reference. For example, as depicted in FIGS. 5(a) and 5(c), if the typical time interval, denoted by τ, between occurrences at which the neighboring base station is lightly loaded is at least a predefined multiple smaller than the remaining time of the delay requirement, denoted by Δ (delta), for a mobile device in a handoff region, this mobile device need not be given the highest priority (transmission can be delayed) each time the neighboring base station is lightly loaded, since this light loading is likely to occur one or more number of times during the remaining allowed delay time delta (step 510). The predefined multiple, for example, is often three, meaning that if τ is at least three times as small as the remaining time of the delay requirement the mobile device will not be given the highest priority. However, if τ is roughly the same size as the remaining Δ, as in FIG. 5(b), then a mobile device in a handoff region should be given high priority during a time at which the neighboring base station is lightly loaded, since the light loading is unlikely again before the remaining allowed delay time Δ expires (step 512). The above priority methods are preferably used in conjunction with the above operating condition methods "A"–"F" such that priority is first determined then a operating condition method is implemented based upon the available resources which were defined by the priority.

Use of speed, location and direction information as a control parameter to determine scheduling can also be used on the up link transmission from mobile device to base station by use of operating conditions "A"–"F" for the up link RF signal. In this case interference from other base stations is replaced by interference from other mobile devices. However, the system can be configured such that the operating condition methods are processed entirely by the control system 400 or such that processing is shared between the control system 400 and the mobile device itself. Such a determination is based upon network and mobile device resources, primarily memory, and can be routinely determined by one skilled in the art. By employing the methods of operating conditions "A"–"F" on the up and down links increased efficiency can be obtained.

It is to be understood that the above description is intended to be illustrative and not restrictive of the invention. Many variations to the above-described operating condition methods will be readily apparent to those having ordinary skill in the art. For example, although three control parameters (speed, location and direction) are described above in the exemplary embodiment, other embodiments of the present invention may use only one or two of these three control parameters. In addition, the threshold signal power, predefined heavy load amount, predefined light load amount and predefined multiple can all vary based upon the environment and environmental conditions. However, such conditions and amounts to vary such variables are well known by those skilled in the art.

The scope of the present invention is not to be considered as limited by the specifics of the particular methods which have been described and illustrated, but is only limited by the scope of the appended claims.

What is claimed as new and desired to be protected by Letters Patent of the United States is:

1. A method of transmitting data to a wireless mobile device, said method comprising:
   determining at least one of speed, location or direction information for a mobile device;
   using said speed and at least one of location or direction information as a parameter to control a data rate for signal transmission from one or more base stations of a wireless system servicing said mobile device, wherein said at least one of speed, location or direction information is used to determine which one of said base stations should transmit to said mobile device.

2. The method of claim 1 wherein said at least one of speed, location or direction information is used to determine what signal power a base station should use in its transmissions to said mobile device.

3. The method of claim 2, wherein said transmission signal power is at least a required signal power to transmit a signal to said mobile device.

4. The method of claim 3, wherein said at least one of speed, location or direction information is used to control the transmission of a first base station toward which said mobile station is moving by delaying transmission of data from said first base station to said mobile device until said mobile device is located close enough to said base station such that a required signal power for transmission to said mobile device is less than or equal to a threshold signal power.

5. The method claim 4 further comprising transmitting data from said first base station to said mobile device at a first data rate using said required signal power and transmitting data at a second data rate using a signal power greater than said required signal power.

6. A method of claim 5 further comprising increasing a rate of data transmission from said first data rate to said second data rate when said transmission signal power is greater than said required signal power.

7. The method claim 5 further comprising transmitting data from said first base station to said mobile device at said second data rate when said mobile device is moving away from said first base station cell and toward a second base station which has allocated at least a predefined heavy load amount of its total RF signal power.

8. A method of claim 1 further comprising controlling said base stations such that neighboring base stations use a soft handoff during a data transmission when said mobile device is in a handoff region and is entering a cell of a base station having allocated not more than a predefined light load amount of the total RF signal power.

9. A method of claim 1 further comprising controlling said base stations such that neighboring base stations use a soft handoff during a data transmission when said mobile device is in a handoff region and a base station servicing said mobile device has allocated at least a predefined heavy load amount of its total RF signal power.

10. A method of claim 1 further comprising controlling said base stations such that neighboring base stations use a soft handoff during a data transmission when said mobile device is in a handoff region and a base station servicing said mobile device is more heavily loaded than a base station region to which said mobile device is moving.

11. A method of claim 1 further comprising delaying transmission of data to said mobile device when it is not in the process of receiving a data transmission and when a base station assigned to transmit to said mobile device has allocated at least a predefined heavy load amount of its total RF signal power and a neighboring base station has allocated not more than a predefined light load amount of the total RF signal power.

12. The method of claim 11 further comprising providing a transmission by a neighboring base station to said mobile device when said mobile device is in a handoff region between said base stations.

13. The method of claim 1 further comprising providing transmission of data to said mobile device by a neighboring base station when said mobile device is in a handoff region between a base station transmitting to it and, said neighboring base station has allocated not more than a predefined light load amount of the total RF signal power.

14. The method of claim 1 further comprising providing a transmission signal power greater than a required signal power from a base station to said mobile device when said mobile device is moving towards a known coverage hole.

15. The method of claim 1 further comprising delaying a data transmission from a base station to said mobile device when said mobile device is moving towards a known coverage hole.

16. The method of claim 1 further comprising delaying transmission to said mobile device when the remaining maximum delay time for transmission to said mobile device is not less than a predefined multiple of a time interval for when said base station has allocated not more than a predefined light load amount of the total RF signal power.

17. The method of claim 1 further comprising providing a transmission signal to said mobile device when the remaining maximum delay time for transmission to said mobile device is less than a predefined multiple of a time interval for when said base station has allocated not more than a predefined light load amount of the total RF signal power.

18. The method of claim 1 comprising determining said speed and location information for said mobile device.

19. The method of claim 1 comprising using said speed and location information as a parameter to control said signal transmission from said one or more base stations of said wireless system servicing said mobile device.

20. The method of claim 1 comprising determining said location and direction information for said mobile device.

21. The method of claim 1 comprising using said location and direction information as a parameter to control said signal transmission from said one or more base stations of said wireless system servicing said mobile device.

22. The method of claim 1 comprising determining said speed and direction information for said mobile device.

23. The method of claim 1 comprising using said speed and direction information as a parameter to control said signal transmission from said one or more base stations of said wireless system servicing said mobile device.

24. A method of transmitting data from a wireless mobile device to a base station, said method comprising:
determining at least one of speed, location or direction information for a mobile device;
using said speed and at least one of location or direction information as a parameter to control a data rate for signal transmission to one or more base stations of a wireless system from said mobile device, wherein said at least one of speed, location or direction information is used to determine which one of said base stations should receive a transmission from said mobile device.

25. The method of claim 24 wherein said at least one of speed, location or direction information is used to determine what signal power said mobile device should use in its transmissions to said one or more base stations.

26. The method of claim 25, wherein said transmission signal power is at least a required signal strength to transmit a signal to said one or more base stations.

27. The method of claim 26, wherein said at least one of speed, location or direction information is used to control the transmission to a first base station toward which said mobile station is moving by delaying transmission of data to said first base station from said mobile device until said mobile device is located close enough to said first base station such that a required signal power for transmission to said first base station is less than or equal to a threshold signal power.

28. The method claim 27 further comprising transmitting data to said first base station from said mobile device at a first data rate using said required signal power and transmitting data at a second data rate using a signal power greater than said required signal power.

29. A method of claim 28 further comprising increasing a rate of data transmission from said first data rate to said second data rate when said transmission signal power is greater than said required signal power.

30. The method claim 28 further comprising transmitting data to said first base station from said mobile device at said second data rate when said mobile device is moving away from said first base station cell and toward a second base station which has allocated at least a predefined heavy load amount of its total RF signal receiving capacity.

31. A method of claim 24 further comprising controlling said base stations such that neighboring base stations use a soft handoff during a data transmission when said mobile device is in a handoff region and is entering a cell of a base station having allocated not more than a predefined light load amount of the total RF signal receiving capacity.

32. A method of claim 24 further comprising controlling said base stations such that neighboring base stations use a soft handoff during a data transmission when said mobile device is in a handoff region and a base station servicing said mobile device has allocated at least a predefined heavy load amount of its total RF signal receiving capacity.

33. A method of claim 24 further comprising controlling said base stations such that neighboring base stations use a soft handoff during a data transmission when said mobile device is in a handoff region and a base station servicing said mobile device is more heavily loaded than a base station region to which said mobile device is moving.

34. A method of claim 24 further comprising delaying transmission of data when said mobile device is not in the process of sending a data transmission and when a base station assigned to receive said data transmission from said mobile device has allocated at least a predefined heavy load amount of its total RF signal receiving capacity and a neighboring base station has allocated not more than a predefined light load amount of the total RF signal receiving capacity.

35. The method of claim 33 further comprising providing a transmission to a neighboring base station from said mobile device when said mobile device is in a handoff region between said base stations.

36. The method of claim 24 further comprising providing transmission of data from said mobile device to a neighboring base station when said mobile device is in a handoff region and said neighboring base station has allocated not more than a predefined light load amount of the total RF signal receiving capacity.

37. The method of claim 24 further comprising providing a transmission signal power greater than said required signal power to a base station from said mobile device when said mobile device is moving towards a known coverage hole.

38. The method of claim 24 further comprising delaying a data transmission to a base station from said mobile device when said mobile device is moving towards a known coverage hole.

39. The method of claim 24 further comprising delaying transmission from said mobile device when the remaining maximum delay time for transmission from said mobile device is not less than a predefined multiple of a time interval for when said base station has allocated not more than a predefined light load amount of the total RF signal receiving capacity.

40. The method of claim 24 further comprising providing a transmission signal from said mobile device when the remaining maximum delay time for transmission from said mobile device is less than a predefined multiple of a time interval for when said base station has allocated not more than a predefined light load amount of the total RF signal receiving capacity.

41. The method of claim 24 comprising determining said speed and location information for said mobile device.

42. The method of claim 24 comprising using said speed and location information as a parameter to control said signal transmission to said one or more base stations of said wireless system servicing said mobile device.

43. The method of claim 24 comprising determining said location and direction information for said mobile device.

44. The method of claim 24 comprising using said location and direction information as a parameter to control said signal transmission to said one or more base stations of said wireless system servicing said mobile device.

45. The method of claim 24 comprising determining said speed and direction information for said mobile device.

46. The method of claim 24 comprising using said speed and direction information as a parameter to control said signal transmission to said one or more base stations of said wireless system servicing said mobile device.

* * * * *